United States Patent [19]

Tanaka et al.

[11] Patent Number: 5,610,212
[45] Date of Patent: Mar. 11, 1997

[54] MEANS FOR MECHANICALLY STABILIZING DEPROTEINIZED NATURAL RUBBER LATEX

[75] Inventors: Yasuyuki Tanaka, Tokyo; Yuichi Hioki; Masaharu Hayashi, both of Wakayama; Naoya Ichikawa; Toshiaki Sakaki, both of Hyogo, all of Japan

[73] Assignees: Kao Corporation, Tokyo; Sumitomo Rubber Industries, Ltd., Hyogo, both of Japan

[21] Appl. No.: 241,989

[22] Filed: May 13, 1994

[30] Foreign Application Priority Data

May 13, 1993 [JP] Japan .................................. 5-111765

[51] Int. Cl.$^6$ ........................................................ C08K 5/41
[52] U.S. Cl. ..................... 524/156; 524/158; 524/502; 524/571; 524/575.5
[58] Field of Search .................................. 524/525, 158, 524/156, 502, 571, 575.5

[56] References Cited

U.S. PATENT DOCUMENTS 1,838,826  12/1931  Gunther et al. .

FOREIGN PATENT DOCUMENTS 1366934  9/1974  United Kingdom .
2011933  7/1979  United Kingdom .
2098222  11/1982  United Kingdom .

OTHER PUBLICATIONS

A. D. Robert, "Natural Rubber Science and Technology", Oxford University Press, Oxford, GB, 1990, pp. 102–103.

Primary Examiner—Edward J. Cain
Attorney, Agent, or Firm—Sughrue, Mion, Zinn, Macpeak & Seas

[57] ABSTRACT

A means for stabilizing a deproteinized natural rubber latex is disclosed, comprising adding a stabilizer selected from the group consisting of (a) an anionic surfactant, (b) an amphoteric surfactant, (c) a nonionic surfactant, (d) a nonionic or amphoteric oligomer or polymer, and (e) an anionic oligomer or polymer. By adding the stabilizer, the mechanical stability of a deproteinized natural rubber latex can be markedly improved.

5 Claims, No Drawings

MEANS FOR MECHANICALLY STABILIZING DEPROTEINIZED NATURAL RUBBER LATEX

FIELD OF THE INVENTION

This invention relates to a means for stabilizing a deproteinized natural rubber latex.

BACKGROUND OF THE INVENTION

Natural rubber has hitherto been used widely as industrial products, such as automobile tires, belts and pressure-sensitive adhesives, and household goods, such as gloves. These natural rubber articles are generally produced by coagulating the rubber content of a natural rubber latex to obtain raw rubber called crepe rubber or smoked sheet rubber, and further processing the raw rubber through steps of mastication, compounding of additives, molding, and vulcanization.

It was recently reported that medical tools made of natural rubber, such as surgical gloves, various catheters, and analgesic masks, provoke labored respiration or anaphylactoid symptoms, such as vascular edema, nettle rash, detelectasis and cyanosis, in patients. Cases were also reported in which women with a history of allergy suffered a pain in the hands, nettle rash or vascular edema around the eyes when they used rubber gloves made of natural rubber.

These symptoms seem to be attributed to the protein present in natural rubber. Food and Drug Administration (FDA), U.S.A. has called on manufactures of natural rubber articles to reduce the protein content. It has therefore been demanded to remove protein from natural rubber.

Natural rubber is obtained from Hevea trees as a latex containing a rubber content, water, protein, inorganic salts, and other impurities. The latex oozing out from the tapped trunk of a rubber plant is collected in a cup, gathered at a refining factory where it is coagulated to obtain raw rubber (crepe rubber or smoked sheet rubber) or concentrated by centrifugation to obtain a purified latex.

The protein content in natural rubber has usually been expressed in terms of a nitrogen content (N %) determined by a Kjeldahl method multiplied by 6.3. The present inventors discovered that the proteins in raw rubber obtained from a latex can be confirmed by infrared absorption at 3280 $cm^{-1}$ characteristic of polypeptide.

The present inventors previously found that a deproteinized natural rubber latex showing no IR absorption at 3280 $cm^{-1}$ can be obtained by a process comprising treating a natural rubber latex with a protease and a surfactant either simultaneously or successively and, after allowing the system to stand for a given period of time, recovering the rubber content by centrifugation (see Japanese Patent Application Nos. 208754 to 208758/92 (corresponding to EP-A-0 584 597)).

General natural rubber latex on the market are stable (not coagulated) against mechanical stimulation, such as vigorous stirring or friction. Such stability of latex is measured as mechanical stability (JIS K-6381).

The above-mentioned deproteinized latex has a disadvantage in that the mechanical stability is seriously poorer than general latex on the market. While the reason for the serious reduction in mechanical stability has not yet been clarified, it is considered that the protein contained in general latex is adsorbed by rubber particles and assumes strong negative charges under a condition made alkaline by ammonia addition so that the rubber particles are present in the latex in a considerably stabilized state. To the contrary, not containing such protein acting as a protective layer, the deproteinized latex seems to be labile and apt to undergo agglomeration on receipt of mechanical stimulation.

Additionally, the surfactant which has been used for protein removal is almost removed by subsequent centrifugation and scarcely remains in the deproteinized latex.

SUMMARY OF THE INVENTION

Accordingly, an object of the present invention is to provide a means for stabilizing a deproteinized natural rubber latex free from a fear of eliciting allergy, by which the mechanical stability of a deproteinized natural rubber latex can be improved.

Another object of the present invention is to provide a method for stabilizing a deproteinized natural rubber latex using the means.

As a result of extensive investigations, the present inventors have found that mechanical stability of a deproteinized natural rubber latex, which is obtained by treating a natural rubber latex with a protease and a surfactant, can be markedly improved by addition of a specific surfactant, an oligomer or a polymer. The present invention has been completed based on this finding.

The present invention relates to use of a compound selected from the group consisting of:
- (a) an anionic surfactant,
- (b) an amphoteric surfactant,
- (c) a nonionic surfactant,
- (d) a nonionic or amphoteric oligomer or polymer, and
- (e) an anionic oligomer or polymer as a stabilizer for a deproteinized natural rubber latex.

The present invention also relates to a method for stabilizing a deproteinized natural rubber latex comprising adding to the deproteinized natural rubber latex a stabilizer selected from the group consisting of:
- (a) an anionic surfactant,
- (b) an amphoteric surfactant,
- (c) a nonionic surfactant,
- (d) a nonionic or amphoteric oligomer or polymer, and
- (e) an anionic oligomer or polymer in an amount to give a concentration of from 0.01 to 10% by weight based on the total weight of the latex.

DETAILED DESCRIPTION OF THE INVENTION

The anionic surfactant as stabilizer (a) includes carboxylic acid surfactants, sulfonic acid surfactants, sulfuric ester surfactants and phosphoric ester surfactants.

Examples of the carboxylic acid surfactant include fatty acid salts containing from 6 to 30 carbon atoms, polycarboxylic acid salts, rosinates, dimer acid salts, and tall oil fatty acid salts, with carboxylic acid salts containing from 10 to 30 carbon atoms being preferred. Those having less than 6 carbon atoms tend to achieve insufficient improvement on mechanical stability. Those having more than 30 carbon atoms tend to be difficult to disperse in water. Preferred examples of the polycarboxylic acid include straight-chain or aromatic, saturated or unsaturated dicarboxylic and tricarboxylic acid which may be substituted by hydroxy, amino, ketone group, such as citric acid, ketoglutaric acid, succinic acid, fumaric acid, maleic acid, malic acid, glutamic acid, asparagic acid, phthalic acid, trimellitic acid and pyromellitic acid.

Examples of the sulfonic acid surfactant include alkylbenzenesulfonates, alkylsulfonates, alkylnaphthalenesulfonates, naphthalenesulfonates, diphenyl ether sulfonates, α-olefin sulfonates, dialkyl sulfosuccinates, α-sulfonated fatty acid salts, and methyloleyl taurine. Among them, alkylbenzenesulfonates, alkylnaphthalenesulfonates and dialkylsulfosuccinates wherein the alkyl moiety has from 6 to 30 carbon atoms, preferably from 8 to 20 carbon atoms.

Examples of the sulfuric ester surfactant include alkylsulfuric ester salts, polyoxyalkylene alkylsulfuric ester salts, polyoxyalkylene alkylphenyl ether sulfuric ester salts, polyoxyalkylene tristyrenated phenol sulfuric ester salts, and polyoxyalkylene distyrenated phenol sulfuric ester salts. Among them, alkylsulfuric ester salts, polyoxyalkylene alkylsulfuric ester salts, polyoxyalkylene alkylphenyl ether sulfuric ester salts, and polyoxyalkylene distyrenated phenol sulfuric ester salts. Examples of the polyoxyalkylene group include those comprising from 1 to 100 mol, preferably from 1 to 50 mol, of an alkylene oxide having 2 to 4 carbon atoms, preferably from 2 to 3 carbon atoms. Examples of the alkyl group include those having 6 to 30 carbon atoms, preferably from 8 to 20 carbon atoms.

Examples of the phosphoric ester surfactant include alkyl phosphoric ester salts and polyoxyalkylene phosphoric ester salts. Preferred examples thereof include alkyl phosphoric ester salts wherein the alkyl moiety has from 8 to 20 carbon atoms, and polyoxyalkylene phosphoric ester salts wherein the polyoxyalkylene moiety comprises from 1 to 100 mol, preferably from 1 to 50 mol, of an alkylene oxide having from 2 to 3 carbon atoms.

The salts of these compounds as stabilizer (a) include salts with a metal (e.g., Na, K, Ca, Mg or Zn), ammonia salts, and amine salts (e.g., triethanolamine salt).

The amphoteric surfactant as stabilizer (b) includes amino acid surfactants, betaine surfactants, and amine oxide surfactants.

Preferred examples of the amino acid surfactant include monoalkylaminoalkylene carboxylic acid salts and dialkylaminoalkylene carboxylic acid salts.

Preferred examples of the betaine surfactant include alkyldimethylcarboxymethylammonium betaines, trialkylsulfoalkyleneammonium betaines, dialkylbispolyoxyalkyleneammonium sulfuric ester betaines, alkylcarboxymethylhydroxyethylimidazolinium betaines. Among them, alkyldimethylcarboxymethylammonium betaines are more preferred.

Preferred examples of the amine oxide surfactant include alkyldimethylamine oxides.

In the above-mentioned amphoteric surfactants, examples of the alkyl group include an alkyl group containing from 6 to 30 carbon atoms, preferably from 8 to 20 carbon atoms, and more preferably from 10 to 16 carbon atoms.

The nonionic surfactant as stabilizer (c) includes polyoxyalkylene ether surfactants, polyoxyalkylene ester surfactants, polyhydric alcohol fatty acid ester surfactants, sugar fatty acid surfactants, and alkyl polyglucoside surfactants.

Examples of the polyoxyalkylene ether surfactant include polyoxyalkylene alkyl ethers, polyoxyalkylene alkylphenyl ethers, polyoxyalkylene polyol alkyl ethers, polyoxyalkylene styrenated phenol ethers, and polyoxyalkylene tristyrenated phenol ethers. Examples of the polyol of the polyoxyalkylene polyol alkyl ethers include polyhydric alcohols having 2 to 12 carbon atoms, such as propylene glycol, glycerin sorbitol, glucose, sucrose, pentaerythritol, and sorbitan. Among them, polyoxyalkylene alkyl ethers and polyoxyalkylene alkylphenyl ethers are preferred.

Examples of the polyoxyalkylene ester surfactant include polyoxyalkylene fatty acid esters.

Examples of the polyhydric alcohol fatty acid ester surfactant include fatty acid esters of a polyhydric alcohol containing 2 to 12 carbon atoms and fatty acid esters of a polyoxyalkylene polyhydric alcohol. Specific examples thereof include a sorbitol fatty acid ester, a sorbitan fatty acid ester, a fatty acid monoglyceride, a fatty acid diglyceride, and a polyglycerin fatty acid ester. Polyalkylene oxide adducts of these ester compounds, such as a polyoxyalkylene sorbitan fatty acid ester and a polyoxyalkylene glycerin fatty acid ester, may also be used. Among them, fatty acid esters of a polyhydric alcohol is preferred. More specific examples thereof include polyoxyalkylene sorbitol fatty acid esters, polyoxyalkylene sorbitan fatty acid esters, polyoxyalkylene glycerin fatty acid esters and polyglycerin fatty acid esters.

Examples of the sugar fatty acid ester surfactant include a fatty acid ester of sucrose, glucose, maltose, fructose or a polysaccharide. A polyalkylene oxide adduct of these esters may also be used. Among them, a fatty acid ester of sucrose is preferred.

Examples of the alkyl polyglucoside surfactant include an alkylglucoside and an alkyl polyglucoside. Fatty acid esters of these compounds may also be used. Polyalkylene oxide adducts of these compounds are also employable. Among them, an alkyl polyglucoside and a polyalkylne oxide adduct of an alkylglucoside are preferred.

In the above-mentioned nonionic surfactants, examples of the alkyl group include an alkyl group containing from 4 to 30 carbon atoms. The polyoxyalkylene group includes those having an alkylene group containing from 2 to 4 carbon atoms. The number of moles of an added alkylene oxide, e.g., ethylene oxide, is from about 1 to 50. The fatty acid includes straight-chain or branched and saturated or unsaturated fatty acids containing from 4 to 30 carbon atoms.

The nonionic or amphoteric oligomer or polymer as stabilizer (d) includes polyvinyl alcohol, polyethylene glycol, ethylene oxide-propylene oxide copolymers, hydroxyethyl cellulose, hydroxypropyl cellulose, methyl cellulose, and starch derivatives.

The anionic oligomer or polymer as stabilizer (e) includes:

(1) a water-soluble or water-dispersible polymer comprising one or more monomers selected from an unsaturated carboxylic acid and a derivative thereof, (2) a water-soluble or water-dispersible polymer comprising an unsaturated sulfonic acid or a derivative thereof, (3) a formalin condensate of a sulfonated polycyclic aromatic compound which may contain a hydrocarbon group as a substituent, and (4) a mixture of two or more of (1) to (3).

The above-mentioned polymer (1) may be prepared from one or more monomers selected from unsaturated monocarboxylic acids (e.g., acrylic acid, methacrylic acid), dicarboxylic acids (e.g., maleic acid), alkali metal salts thereof (e.g., sodium salts), ammonium salts thereof, and organic amine salts thereof (e.g., triethanolamine salts). These monomers may be used in combination with another monomers compolymerizable therewith, such as vinyl acetate, isobutylene, diisobutylene, styrene, alkyl acrylates, alkyl methacrylates, hydroxyethyl(meth)acrylate, polyoxyethylene (meth)acrylate, (meth)acrylamide, and diaceton acrylamide.

These monomers can be polymerized or copolymerized in a conventional manner. The proportion of the monomer components and the polymerization degree of the polymer or copolymer to be obtained are not specifically restricted but it is necessary that the resulting polymer or copolymer should be water-soluble or water-dispersible.

Specific examples of the polymer (1) include acrylic acid polymer, methacrylic acid copolymer, acrylic acid/methacrylic acid copolymer, acrylic acid/polyoxyethylene methacrylic ester copolymer, acrylic acid/methyl acrylate copolymer, acrylic acid/vinyl acetate copolymer, acrylic acid/maleic acid copolymer, maleic acid/isobutylene copolymer, maleic acid/styrene copolymer, and alkali metal, ammonia and organic amine salts thereof. These polymers and copolymers may be used alone or in combination of two or more of them.

Examples of the above-mentioned polymer (2) include those prepared by polymerizing the unsaturated sulfonic acid, such as styrenesulfonic acid, 2-acrylamide-2-methylpropanesulfonic acid, vinylsulfonic acid, methacrylsulfonic acid, acrylsulfonic acid and the like, or by copolymerizing the unsaturated sulfonic acid with another monomer, such as hydrophobic monomers (e.g., alkyl acrylate, alkyl methacrylate, vinyl alkyl ether, vinyl acetate, ethylene, propylene, butylene, butadiene, diisobutylene, vinyl chloride, vinylidene chloride, acrylonitrile, and styrene), hydrophilic monomers (e.g., acrylic acid, methacrylic acid, maleic acid, fumaric acid, maleic anhydride, vinyl alcohol, acrylamide, methacrylamide, diacetoneacrylamide, N-vinylpyrrolidone, 2-acrylamide-2-methylpropanesulfonic acid, methallylsulfonic acid, xylenesulfonic acid, and naphthalenesulfonic acid). Among them, polymers and copolymers of a styrenesulfonic acid salt are more preferred.

The polymer of a styrenesulfonic acid salt may be prepared by polymerizing a styrenesulfonic acid salt or sulfonating a polystyrene. The polymer of styrenesulfonic acid salt has a structure represented by the following formula:

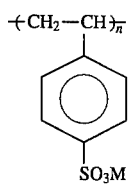

The molecular weight of the polymer of a styrenesulfonic acid salt is preferably from 1,000 or more, more preferably from 10,000 to 3,000,000. In the above formula, M represents an alkali metal (e.g., lithium, sodium, potassium), an ammonium group, an alkylamine or an alkanolamine.

The copolymer of a styrenesulfonic acid salt may be prepared by copolymerizing a styrenesulfonic acid salt with another monomer or sulfonating a copolymer of styrene with another monomer. Preferred examples of the copolymer include a (meth)acrylic acid-styrenesulfonic acid copolymer. In this copolymer, the molar ratio of (meth)acrylic acid residue and styrenesulfonic acid is preferably from 1/10 to 10/1, more preferably from 1/3 to 7/1. The average molecular weight thereof is preferably from 1,000 to 1,000,000, more preferably from 10,000 to 700,000. Examples of the salt of the copolymer include sodium salts, potassium salts, ammonium salts, diethanolamine salts, triethanolamine salts, monoisopropanolamine salts, diisopropanolamine salts, triisopropanolamine salts, and 2-amino-2-methylpropane-1,3-diol salts. In this instance, unneutralized portions may be remained in the copolymer so long as they deteriorate the properties of the copolymer.

The above-mentioned condensate (3) may be prepared by subjecting naphthalene, alkyl-substituted benzene, alkyl-substituted naphthalene, anthracene, alkyl-substituted anthracene, lignin, or compounds having an aromatic ring contained in petroleum residue to sulfonating reaction in a conventional manner, and subsequently to salt formation reaction and formaldehyde condensation. In this instance, the polymerization degree is preferably from 2 to 30, more preferably from 3 to 10. When the polymerization degree is less than 2, the effect of condensation is not fully achieved, whereas when the polymerization degree is more than 30, the molecular weight of the polymer becomes high, which may be disadvantageous in solubility in water, for example.

As the aromatic compound, various kinds of aromatic compounds may be used and preferred examples thereof include lignin, xylene, toluene, naphthalene and alkylnaphthalene wherein the alkyl moiety has from 1 to 6 carbon atoms. These aromatic compounds may be used alone or in combination of two or more of them.

Specific examples of the condensate (3) include formalin condensates of petroleum sulfonic acid derivatives, lignin sulfonate acid derivatives, naphthalene sulfonate derivatives, xylene sulfonate derivatives and alkylbenzene sulfonate derivatives. Examples of the salt thereof include alkali metal (e.g., sodium, potassium) salts, alkaline earth metal (e.g., calcium) salts, amine salts, ammonium salts and the like.

Preferred examples of stabilizer (e) includes a styrenesulfonic acid copolymer, a homo- or copolymer of acrylamide t-butylsulfonic acid, a homo- or copolymer of a vinylsulfonate, a homo- or copolymer of a 3-sulfopropyl(meth)acrylic ester salt, a formalin-naphthalenesulonic acid condensate, lignin sulfonic acid, a polycyclic aromatic sulfonic acid copolymer, a homo- or copolymer of acrylic acid and maleic anhydride, and an isobutylene- or diisobutylenemaleic anhydride copolymer.

Among stabilizers (a) to (e), (a), (b), (c) and (e) are preferred and (a), (b) and (e) are further preferred.

The solid content of the latex is normally from 5 to 60% by weight. The stabilizer according to the present invention is added to a deproteinized natural rubber latex so as to give a concentration of from 0.01 to 10% by weight, and preferably from 0.1 to 5% by weight based on the total weight of the latex. If the concentration of the stabilizer is less than 0.01%, sufficient stabilizing effect may not be obtained. Concentrations exceeding 10% are uneconomical.

The present invention will now be illustrated in greater detail with reference to Examples, but it is to be understood that the present invention should not be construed as being limited thereto. All the percents and ratios are given by weight unless otherwise noted.

EXAMPLES 1 TO 12

A high ammonia latex of natural rubber was treated with a protease (alkali protease) and a surfactant (a 60:40 mixture of sodium dodecylbenzenesulfonate and polyoxyethylene (9 mol) lauryl ether) to prepare a deproteinized natural rubber latex showing no polypeptide absorption at 3280 cm$^{-1}$ in the IR spectrum. Each of the stabilizers shown in Table 1 below was added thereto in the concentration shown therein, and the total solids content was adjusted to 55±0.2% to obtain a stabilized deproteinized natural rubber latex.

The mechanical stability of the resulting latex was evaluated according to the following test method (JIS K 6381).

For comparison, a latex prepared by adding sodium laurylsulfate to a concentration of 0.005% as a stabilizer and, as a control, a latex containing no stabilizer were tested in the same manner. The results obtained are shown in Table 1.

Mechanical Stability Test Method

A latex is put in a sample container and vigorously agitated by rotating a shaft at a prescribed speed. The mechanical stability is represented by the time (MST; sec) from the start of agitation to the end point where a visually distinguishable aggregate begins to form. In general, a latex having an MST of not less than 500 seconds is regarded stable.

TABLE 1

| Example No. | Stabilizer | Concentration (wt. %) | MST (sec) |
|---|---|---|---|
| 1 | Sodium laurylsulfate (Emal 10 powder*[1]) | 1.0 | 1200 |
| 2 | Potassium oleate (FR-14*[2]) | 0.5 | 600 |
| 3 | Sodium dodecylbenzenesulfonate (Neopelex F-65*[3]) | 0.5 | 1300 |
| 4 | Polyoxyethylene (9) nonylphenyl ether (Emulgen 909*[4]) | 3.0 | 1100 |
| 5 | Polyoxyethylene (20) sorbitan oleyl ester (Rheodor TWO-120*[5]) | 5.0 | 1400 |
| 6 | Sodium lauryl phosphate | 2.0 | 1000 |
| 7 | Hexaglycerin monooleate (polymerization degree: 6) | 2.5 | 900 |
| 8 | Polyoxyethylene (10) monooleate (Emanon 4110*[6]) | 3.0 | 1200 |
| 9 | Laurylglucoside | 1.0 | 700 |
| 10 | Sodium salt of formalin-naphthalene-sulfonic acid condensate (Demol N*[7]) (number of condensation (n) = 5) | 1.0 | 800 |
| 11 | Lauryl acetobetaine (Amphitol 20BS*[8]) | 2.0 | 1100 |
| 12 | Polyvinyl alcohol (saponification degree: 78.5–81.5 mol %) | 2.5 | 1000 |
| 13 | Sodium polyoxyethylene (3) dodecyl ether sulfate | 0.5 | 1800< |
| 14 | Sodium polyoxyethylene (20) nonylphenyl ether sulfate | 3.0 | 800 |
| 15 | Sodium bis(2-ethylhexyl)sulfosuccinate | 2.0 | 600 |
| 16 | Sodium polyacrylate (mw = about 8,000) | 1.0 | 900 |
| 17 | Acrylic acid/maleic acid copolymer (Mw = about 4,000) | 1.0 | 650 |
| Comparative Example | Sodium laurylsulfate | 0.005 | 210 |
| Control | None | — | 70 |

Note:
(1) *[1] to *[8] are all trade names of products of Kao Corp.
(2) The numbers in the parentheses are the number of moles of an added alkylene oxide unless otherwise specified.

As can be seen from the results in Table 1, addition of the stabilizer according to the present invention brings about remarkable improvement in mechanical stability of a deproteinized natural rubber latex.

As described and demonstrated above, the stabilizer according to the present invention improves mechanical stability of a deproteinized natural rubber latex, whereby it is possible to provide a stabilized latex which has stable quality and entertains no fear of causing allergy.

While the invention has been described in detail and with reference to specific examples thereof, it will be apparent to one skilled in the art that various changes and modifications can be made therein without departing from the spirit and scope thereof.

What is claimed is:

1. A method for improving mechanical stability of a deproteinized natural rubber latex, which comprises the step of adding to the deproteinized natural rubber latex a stabilizer selected from the group consisting of an alkylbenzene sulfonate and a polyoxyalkylene alkylsulfuric acid ester salt, wherein the stabilizer is employed in an amount to give a concentration of from 0.01 to 10% by weight based on the total weight of the deproteinized natural rubber latex.

2. The method according to claim 1 wherein a process for making the deproteinized natural rubber latex comprises the step of treating a natural rubber latex with a protease and a surfactant to make the deproteinized natural rubber latex.

3. The method according to claim 1 wherein the deproteinized natural rubber latex lacks polypeptide absorption at 3280 cm$^{-1}$ in the IR spectrum.

4. A rubber latex composition comprising a deproteinized natural rubber latex and a stabilizer, wherein the stabilizer is selected from the group consisting of an alkylbenzene sulfonate and a polyoxyalkylene alkylsulfuric acid ester salt, wherein the stabilizer is employed in an amount to give a concentration of from 0.01 to 10% by weight based on the total weight of the deproteinized natural rubber latex.

5. A method for preparing a deproteinized natural rubber latex, which comprises the steps of:

(1) treating a natural rubber latex with a protease and a first surfactant, (2) removing a hydrolized protein and the first surfactant from the treated natural rubber latex, and (3) adding to the deproteinized natural rubber latex to improve the mechanical stability of the deproteinized natural rubber latex a stabilizer selected from the group consisting of a second surfactant, an oligomer and a polymer, wherein the stabilizer can be anionic, amphoteric, or nonionic, and is employed in an amount to give a concentration of from 0.01 to 10% by weight based on the total weight of deproteinized natural rubber latex.

* * * * *